(12) United States Patent
Zhao et al.

(10) Patent No.: US 12,533,430 B2
(45) Date of Patent: Jan. 27, 2026

(54) METAL NUCLIDE-LOADED CARBON MICROSPHERE (CMS), PREPARATION METHOD, AND USE THEREOF

(71) Applicant: CHENGDU NEW RADIOMEDICINE TECHNOLOGY CO., LTD., Chengdu (CN)

(72) Inventors: Xiaosheng Zhao, Ganzhou (CN); Chixiang Zhang, Chengdu (CN); Jing Lu, Chongqing (CN); Jun Zhang, Guangyuan (CN); Zhuoming Li, Chengdu (CN); Shuang Zhang, Nanchong (CN); Xianjin Luo, Zhaotong (CN); Dongmei Li, Chengdu (CN); Xuezheng Hu, Chengdu (CN); Qiang Ge, Chengdu (CN); Maoliang Li, Chengdu (CN); Jiming Cai, Chengdu (CN)

(73) Assignee: CHENGDU NEW RADIOMEDICINE TECHNOLOGY CO., LTD., Chengdu (CN)

( * ) Notice: Subject to any disclaimer, the term of this patent is extended or adjusted under 35 U.S.C. 154(b) by 656 days.

(21) Appl. No.: 17/916,091

(22) PCT Filed: Apr. 23, 2021

(86) PCT No.: PCT/CN2021/089201
§ 371 (c)(1),
(2) Date: Sep. 30, 2022

(87) PCT Pub. No.: WO2022/041804
PCT Pub. Date: Mar. 3, 2022

(65) Prior Publication Data
US 2023/0149570 A1 May 18, 2023

(30) Foreign Application Priority Data
Aug. 26, 2020 (CN) .......................... 202010868776.0

(51) Int. Cl.
*A61K 51/12* (2006.01)
*A61K 51/04* (2006.01)
*C01B 32/354* (2017.01)

(52) U.S. Cl.
CPC ...... *A61K 51/1244* (2013.01); *A61K 51/0474* (2013.01); *C01B 32/354* (2017.08); *C01P 2004/32* (2013.01); *C01P 2004/61* (2013.01)

(58) Field of Classification Search
None
See application file for complete search history.

(56) References Cited

U.S. PATENT DOCUMENTS

2011/0038794 A1  2/2011  Taran et al.

FOREIGN PATENT DOCUMENTS

| CN | 101321542 A | 12/2008 |  |
|---|---|---|---|
| CN | 101885485 | * 1/2013 |  |
| CN | 101885485 B | * 1/2013 |  |
| CN | 103771545 A | 5/2014 |  |
| CN | 106178006 A | 12/2016 |  |
| CN | 107715122 | * 2/2018 | ............. A61K 51/02 |
| CN | 107715122 A | * 2/2018 | ............. A61K 51/02 |
| CN | 107715123 A | 2/2018 |  |
| CN | 107715124 A | 2/2018 |  |
| CN | 110944678 A | 3/2020 |  |
| CN | 111939276 A | 11/2020 |  |

OTHER PUBLICATIONS

Cai et al (International Journal of Medicine, 2013:8, 1111-1120). (Year: 2013).*
Aydin et al (Turk J Chem, 30, 2006, 145-153). (Year: 2006).*
She Xianliang, Radiotheranostic targeting cancer stem cells with 131I labeled monoclonal antibodies of dual-targets, A dissertation submitted to Huazhong University of Science and Technology for the Degree of Doctor of Medicine, 2020, pp. 1-103.
Zhao Mingqiang, et al., Review: Microspheres for Radioembolization Therapy, CNIC-01918 IAE-0225, pp. 100-110.
Zheng Zhi-Yuan, et al., Application progress of yttrium-90 radiation microspheres in treatment of liver malignancies, Fudan Univ J Med Sci, 2020, pp. 622-627, vol. 47, No. 4.

* cited by examiner

*Primary Examiner* — Celeste A Roney
(74) *Attorney, Agent, or Firm* — Bayramoglu Law Offices, LLC (57) ABSTRACT

A metal nuclide-loaded carbon microsphere (CMS), and a preparation method and a use thereof are provided. The preparation method includes: subjecting a metal ion and a small organic molecule to a reaction in an aqueous solution to obtain a complex; allowing a CMS to adsorb the complex; and subjecting the CMS adsorbing the complex to a first treatment. The metal nuclide-loaded CMS prepared by the method can stably exist in an aqueous solution at a temperature of lower than 180° C. and a pressure of lower than 10 MPa and has a metal nuclide dissolution rate of lower than 0.1% in the aqueous solution. After the prepared metal nuclide-loaded CMS is subjected to moist-heat sterilization at 121° C. for 15 min, a radionuclide release rate is still lower than 0.1%, which can significantly reduce the safety risk of the radioactive microsphere product in clinical use.

10 Claims, 6 Drawing Sheets

METAL NUCLIDE-LOADED CARBON MICROSPHERE (CMS), PREPARATION METHOD, AND USE THEREOF

CROSS REFERENCE TO THE RELATED APPLICATIONS

This application is the national phase entry of International Application No. PCT/CN2021/089201, filed on Apr. 23, 2021, which is based upon and claims priority to Chinese Patent Application No. 202010868776.0, filed on Aug. 26, 2020, the entire contents of which are incorporated herein by reference.

TECHNICAL FIELD

The present disclosure relates to the technical fields of chemicals and medicine, and in particular to a metal nuclide-loaded carbon microsphere (CMS), a preparation method, and a use thereof.

BACKGROUND

CMS is essentially spherical activated carbon and is widely used in the fields of food and medicine, energy storage, and environmental protection due to its characteristics, such as high specific surface area (SSA), developed pores, uniform particle size, stable physical and chemical properties, and excellent biocompatibility. To expand the application of CMS products in chemicals and medical treatment, a metal nuclide is loaded on CMS.

In the prior art, there are two main methods for loading a metal nuclide on a CMS product: loading through direct adsorption; and loading a metal nuclide on a CMS or activated carbon material through complex adsorption with tartaric acid, disodium ethylenediaminetetraacetic acid (EDTA), or the like.

However, in the process of implementing the technical solutions in the embodiments of the present disclosure, the inventors of the present disclosure discovered that the above-mentioned methods have at least the following technical problems: Although the direct adsorption method can be used to prepare a radioactive particle product, the direct adsorption method is only suitable for a few nuclides, such as barium-131, and enables only a small load. In this method, radionuclides are partially loaded on the surface of particles, such that further encapsulation is required to prevent the radionuclides from falling off, resulting in a complicated process. Although the disodium EDTA complex adsorption method can realize the loading of radionuclides, such as yttrium-90, onto carbon materials, the stable loading usually cannot be achieved, and the dissolution rate of the nuclide in a prepared nuclide-loaded CMS product increases with the increase in temperature of the aqueous solution, where when a temperature of the aqueous solution is higher than 100° C., the dissolution rate or release rate of the nuclide is greater than 2.0%. After undergoing moist-heat sterilization at 121° C. for 15 min, a CMS product prepared by the disodium EDTA complex adsorption method cannot meet the index requirements of radioactive microsphere products for the radioactive release rate and has a huge safety risk in clinical use.

SUMMARY

Based on the problems in the background art, the present disclosure is intended to provide a metal nuclide-loaded CMS, a preparation method, and a use thereof. The method of the present disclosure realizes the efficient loading of various metal nuclides on CMS. The prepared metal nuclide-loaded CMS has a metal nuclide dissolution rate of lower than 0.1% in an aqueous solution at a temperature of lower than 180° C. and a pressure of lower than 10 MPa. After the prepared metal nuclide-loaded CMS is subjected to moist-heat sterilization at 121° C. for 15 min, a radionuclide release rate is still lower than 0.1%, which can significantly reduce the safety risk of the radioactive microsphere product in clinical use.

To achieve the above objective, the present disclosure adopts the following technical solutions:

A first aspect of the present disclosure provides a method for preparing a metal nuclide-loaded CMS, including the following steps:

mixing a metal ion, a small organic molecule, and water to allow a reaction to obtain a complex;
allowing a CMS to adsorb the complex; and
subjecting the CMS adsorbing the complex to a first treatment;
where the CMS is a spherical or non-spherical activated carbon product rich in micropores and mesopores, and the metal ion is adsorbed in the pores of the CMS adsorbing the complex.

Further, the small organic molecule may preferably be a planar molecule with strong metal ion-complexing ability. Such a small molecule needs to have a benzene ring or biphenyl structure, and there is/are one or more coordinating groups, such as hydroxyl, carboxyl, and pyridine nitrogen on the benzene ring or biphenyl ring. A simple combination of these features can be considered to produce a small molecule with a similar structure through simple chemical modification.

Further, the small organic molecule may include, but is not limited to: 5-sulfosalicylic acid (5-SSA), 5-nitrosalicylic acid (5-NSA), trimesic acid (TMA), phthalic acid (PA), and isophthalic acid (IPA) when there is carboxyl; sodium catechol-3,5-disulfonate, pyrogallol, resorcinol, and 8-hydroxyquinoline-5-sulfonic acid when there is hydroxyl; 2,6-pyridinedicarboxylic acid, 2-pyridinecarboxylic acid, 1,10-phenanthroline when there is pyridine nitrogen; and/or a small molecule with a similar structure that is obtained through simple chemical modification.

Further, a mixed solution of the metal ion, the small organic molecule, and the water may have a pH value of 1.0 to 12.0 and preferably 3.0 to 7.0.

Further, a molar ratio of the small organic molecule to the metal ion may be (1-1,000):1 and preferably (1.5-15): 1.

Further, the metal ion may include, but is not limited to: scandium ($Sc^{3+}$), yttrium ($Y^{3+}$), lanthanum ($La^{3+}$), cerium ($Ce^{3+}$), praseodymium ($Pr^{3+}$), neodymium ($Nd^{3+}$), promethium ($Pm^{3+}$), samarium ($Sm^{3+}$), europium ($Eu^{3+}$), gadolinium ($Gd^{3+}$), terbium ($Tb^{3+}$), dysprosium ($Dy^{3+}$), holmium ($Ho^{3+}$), erbium ($Er^{3+}$), thulium ($Tm^{3+}$), ytterbium ($Yb^{3+}$), lutetium ($Lu^{3+}$), copper ($Cu^{2+}$), zinc ($Zn^{2+}$), iron ($Fe^{3+}$), cobalt ($Co^{3+}$), nickel ($Ni^{3+}$), titanium ($Ti^{4+}$), gallium ($Ga^{2+}$), and other elements with similar chemical behaviors to the above metal elements and all non-radioactive and radioactive isotopes of the above metal elements. Different nuclides of the same element that have the same number of protons and different numbers of neutrons are isotopes of each other.

Further, the first treatment may refer to any one selected from the group consisting of:

mixing the CMS adsorbing the complex with an anion solution to allow a reaction, such that the metal ion adsorbed in the pores of the CMS reacts with an anion to produce a water-insoluble metal salt, thereby achieving the stable and uniform loading on the CMS;

subjecting the CMS adsorbing the complex to an oxidation treatment, such that the metal ion adsorbed in the pores of the CMS is oxidized into a metal oxide, thereby achieving the stable loading on the CMS; and subjecting the CMS adsorbing the complex to a reduction treatment, such that the metal ion adsorbed in the pores of the CMS is reduced to a metal particle, thereby achieving the stable loading on the CMS.

Further, the anion solution may include, but is not limited to, any one selected from the group consisting of a phosphate solution, a carbonate solution, a tannic acid solution, and a sulfide ion solution.

Further, the oxidation treatment may refer to a high-temperature treatment in an inert gas atmosphere or a trace oxygen-containing atmosphere.

Further, the reduction treatment may refer to a treatment with a reducing agent or a high-temperature reducing gas atmosphere.

In a second aspect, the present disclosure provides a metal nuclide-loaded CMS prepared by the method described in the first aspect, where the metal nuclide-loaded CMS has a metal nuclide dissolution rate of less than 0.1% in an aqueous solution at a temperature of lower than 180° C. and a pressure of lower than 10 MPa.

In a third aspect, the present disclosure provides a use of the metal nuclide-loaded CMS described in the second aspect, where the use includes, but is not limited to, a use in medical treatment.

Further, the particle size and shape of the CMS product do not affect the implementation and use of the method.

Further, when used in medical treatment (such as preparing a drug for radioembolization of a tumor), the CMS product may have a particle size of 0.1 μm to 1,000 μm.

Further, an optimal particle size of a radioactive CMS product for radioembolization of a solid liver tumor may be 20 μm to 60 μm.

Compared with the prior art, the present disclosure has the following beneficial effects.

The preparation method of the present disclosure can simultaneously realize the efficient, stable, and uniform loading of one or more metal ions on a CMS, and these metal ions are stably and uniformly distributed in the pores of the carbon material. The prepared metal nuclide-loaded CMS can stably exist in an aqueous solution at a temperature of lower than 180° C. and a pressure of lower than 10 MPa and has a metal nuclide dissolution rate of lower than 0.1% in the aqueous solution. After the prepared metal nuclide-loaded CMS is subjected to moist-heat sterilization at 121° C. for 15 min, a radionuclide release rate is still lower than 0.1%, which can significantly reduce the safety risk of the radioactive microsphere product in clinical use.

Only a small organic molecule is introduced as an impurity into the product of the method of the present disclosure, and the content of the small organic molecule is controllable. The CMS product for medical treatment can optionally include a small organic molecule with prominent biocompatibility. The metal nuclide-loaded CMS product prepared by the method of the present disclosure can be used in medical treatment.

The method of the present disclosure involves a simple preparation process, can be implemented efficiently, and can easily be scaled up for industrial production.

DETAILED DESCRIPTION OF THE EMBODIMENTS

The specific implementations of the present disclosure are further described below with reference to the accompanying drawings. It should be noted here that the description of these implementations is provided to help explain the present disclosure but does not constitute a limitation to the present disclosure. Further, the technical features involved in the various implementations of the present disclosure described below may be combined as long as they do not conflict with each other.

Example 1

A method for preparing a metal nuclide-loaded CMS includes the following steps:

A metal ion, a small organic molecule, and water were mixed to allow a reaction to obtain a complex. Specifically, the small organic molecule may include, but is not limited to one or more selected from the group consisting of: when there is carboxyl: 5-SSA, 5-NSA, TMA, PA, and IPA; when there is hydroxyl: sodium catechol-3,5-disulfonate, pyrogallol, resorcinol, and 8-hydroxyquinoline-5-sulfonic acid; and when there is pyridine nitrogen: 2,6-pyridinedicarboxylic acid, 2-pyridinecarboxylic acid, 1,10-phenanthroline; and/or a small molecule with a similar structure that is obtained through simple chemical modification. Chemical substances with the same functional group have similar properties, and these small organic molecules easily form a complex with the metal ion in an aqueous solution at a specified pH value.

A CMS was allowed to adsorb the complex, and specifically, a spherical and non-spherical activated carbon with many micropores and mesopores was allowed to adsorb the complex formed by the metal ion and the small organic molecule in the aqueous solution. Under the above pH conditions, the complex can be quickly and efficiently adsorbed in the pores of the CMS to achieve uniform loading.

The CMS adsorbing the complex was subjected to a first treatment.

Example 2

Further, a complexing reaction between the small organic molecule and the metal ion in the aqueous solution may be conducted at an appropriate pH value of 1.0 to 12.0 and preferably 3.0 to 7.0.

Example 3

Further, a molar ratio of the small organic molecule to the metal ion may be (1-1,000):1 and preferably (1.5-15): 1.

Example 4

Further, the metal ion may include, but is not limited to, any one selected from the group consisting of:

scandium ($Sc^{3+}$), yttrium ($Y^{3+}$), lanthanum ($La^{3+}$), cerium ($Ce^{3+}$), praseodymium ($Pr^{3+}$), neodymium ($Nd^{3+}$), promethium ($Pm^{3+}$), samarium ($Sm^{3+}$), europium ($Eu^{3+}$), gadolinium ($Gd^{3+}$), terbium ($Tb^{3+}$), dysprosium ($Dy^{3+}$), holmium ($Ho^{3+}$), erbium ($Er^{3+}$), thulium ($Tm^{3+}$), ytterbium ($Yb^{3+}$), lutetium ($Lu^{3+}$), copper ($Cu^{2+}$), zinc ($Zn^{2+}$), iron ($Fe^{3+}$), cobalt ($Co^{3+}$), nickel ($Ni^{3+}$), titanium ($Ti^{4+}$), gallium ($Ga^{2+}$), and other elements with similar chemical behaviors to the above metal elements and all non-radioactive and radioactive isotopes of the above metal elements.

The "other elements with similar chemical behaviors" refer to elements of the same group in the periodic table of elements; the "isotopes" refer to different nuclides of the same element that have the same number of protons and different numbers of neutrons.

Example 5

Further, the first treatment may be as follows: mixing the CMS adsorbing the complex with an anion solution to allow a reaction, such that the metal ion adsorbed in the pores of the CMS reacts with an anion to produce a water-insoluble metal salt, thereby achieving the stable and uniform loading on the CMS.

The anion solution may include, but is not limited to, any one selected from the group consisting of a phosphate solution, a carbonate solution, a tannic acid solution, and a sulfide ion solution.

Example 6

Further, the first treatment may be as follows: subjecting the CMS adsorbing the complex to an oxidation treatment, such that the metal ion adsorbed in the pores of the CMS is oxidized into a metal oxide, thereby achieving the stable loading on the CMS, where the oxidation treatment may refer to a high-temperature treatment in an inert gas atmosphere or a trace oxygen-containing atmosphere.

Example 7

Further, the first treatment may be as follows: subjecting the CMS adsorbing the complex to a reduction treatment, such that the metal ion adsorbed in the pores of the CMS is reduced into a metal particle, thereby achieving the stable loading on the CMS, where the reduction treatment may refer to a treatment with a reducing agent or a high-temperature reducing gas atmosphere.

Example 8

A metal nuclide-loaded CMS was prepared by the method described in any one of the above examples. The metal nuclide-loaded CMS had a metal nuclide dissolution rate of less than 0.1% in an aqueous solution at a temperature of lower than 180° C. and a pressure of lower than 10 MPa.

Example 9

The preparation method of the metal nuclide-loaded CMS in the above examples can also be used to prepare a metal-doped carbon material, and the prepared metal nuclide-loaded CMS can be used for, but not limited to, medical treatment.

Example 10

Further, the metal nuclide-loaded CMS can be used in medical treatment, where the CMS may have a particle size of 0.1 μm to 1,000 μm, and preferably, an optimal particle size of a radioactive CMS product for radioembolization of a solid liver tumor may be 20 μm to 60 μm.

Example 11

Many factors affect the loading of metal ions on CMS, and rare earth elements have extremely similar chemical behaviors. In this example, with yttrium as a representative rare earth element, the influence of liquid-to-solid ratio, molar ratio, pH, adsorption time, adsorption temperature, added metal ion amount, and the like on the loading behaviors of rare earth nuclide ions on CMS was studied.

11.1 Preparation Method of a Yttrium-Loaded CMS

A yttrium ion, a small organic molecule, and water were mixed to allow a reaction to obtain a complex using the specific method that follows:

A specified volume of a 1.0 g/L yttrium chloride aqueous solution was placed in a reaction flask. Then a specified volume of a 1.0 g/L 5-SSA solution was added, such that a molar amount of the 5-SSA was several times the molar amount of the yttrium ion, and a specified volume of water was added. The pH value of the resulting solution was adjusted, and the solution was thoroughly shaken to obtain the complex for later use.

A CMS was allowed to adsorb the complex, which was specified as follows:

0.25 g of the CMS with a particle size of 20 μm to 60 μm was weighed and added to the complex solution obtained above.

The CMS adsorbing the complex was subjected to a first treatment using the specific method as follows:

A specified volume of a sodium phosphate solution was added to the solution of the CMS adsorbing the complex, and the resulting mixed solution was shaken for 1 min to obtain the yttrium-loaded CMS.

11.2 Influence of Different Conditions on a Yttrium Ion Load Rate

After the CMS was added to the complex solution, the resulting mixture was shaken at a specified temperature for a specified time and then the supernatant was collected and tested for yttrium content to obtain a load rate of the yttrium ion on the CMS. The influence of different liquid-to-solid ratios, different molar ratios, different pH values, different temperatures, different times, and different added yttrium amounts on the adsorption of the CMS to the yttrium ion was studied.

The liquid-to-solid ratio refers to a ratio of a solution mass (g) to a CMS mass (g) during adsorption. The molar ratio refers to the molar ratio of the small organic molecule 5-SSA to the yttrium. The pH value refers to the pH value of the mixed solution of the metal ion, small organic molecule, and water. The temperature refers to the temperature of the reaction system aqueous solution, and the time refers to the time for the CMS to adsorb the yttrium.

(1) Influence of Different Liquid-to-Solid Ratios

Figure 1:
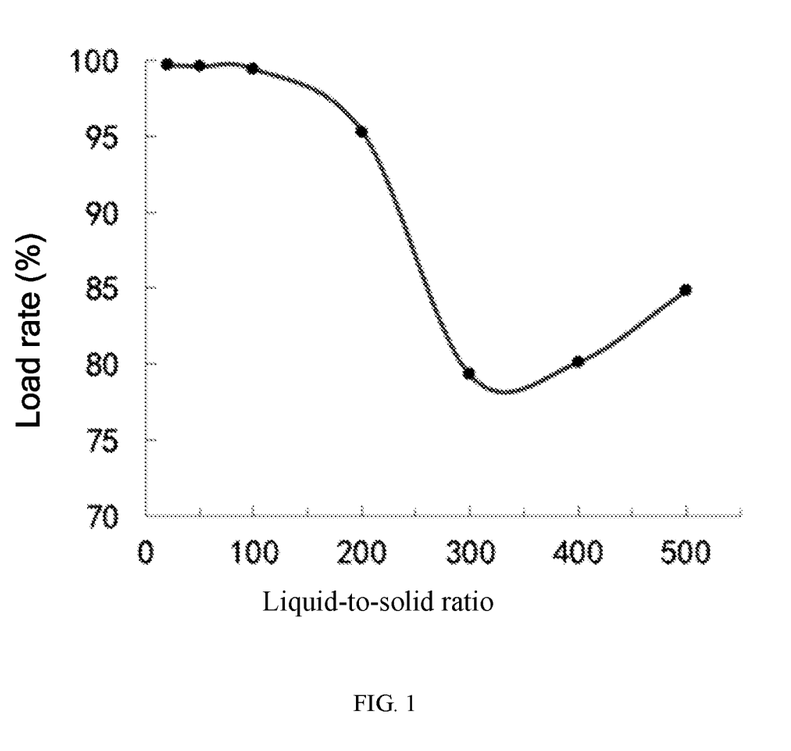
FIG. 1 shows the change of a yttrium load rate in CMS with a liquid-to-solid ratio in Example 11 of the present disclosure.

In this example, yttrium-loaded CMSs prepared at the following liquid-to-solid ratios were tested: 20:1, 50:1, 100:1, 200:1, 300:1, 400:1, and 500:1, and test results are shown in FIG. 1.

It can be seen from FIG. 1 that, when the liquid-to-solid ratio is lower than 100:1, a yttrium load rate of the CMS can be maintained at 98% or higher, and thus a preferred liquid-to-solid ratio is lower than or equal to 100:1.

(2) Influence of Different Molar Ratios

Figure 2:
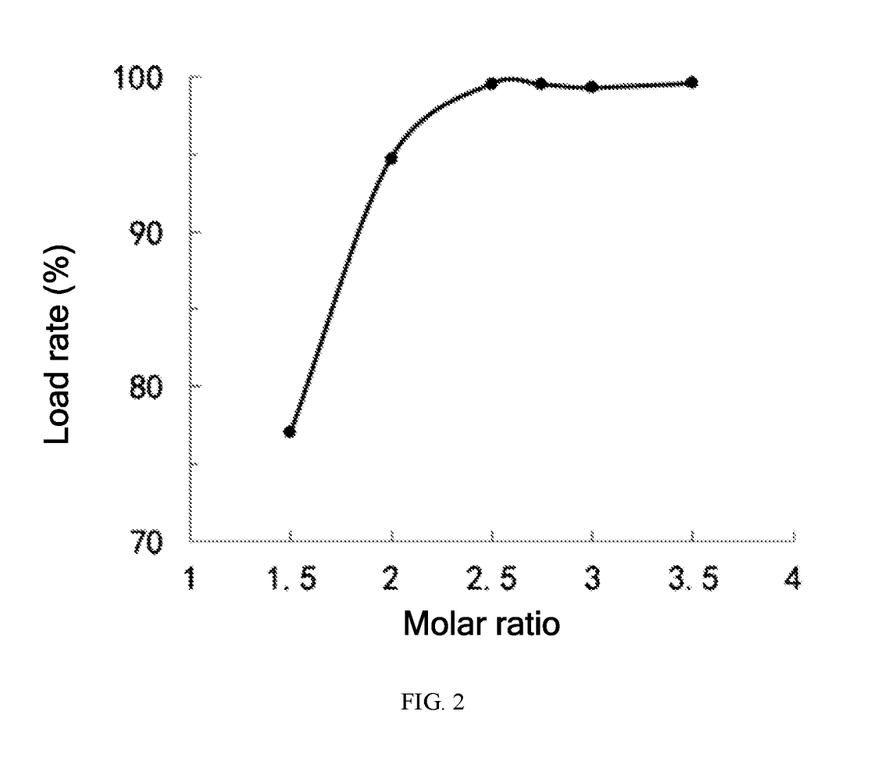
FIG. 2 shows the change of a yttrium load rate in CMS with a 5-SSA/yttrium molar ratio in Example 11 of the present disclosure.

In this example, yttrium-loaded CMSs prepared at the following molar ratios were tested: 1.5:1, 2:1, 2.5:1, 2.7:1, 3:1, and 3.5:1, and test results are shown in FIG. 2.

It can be seen from FIG. 2 that, when the molar ratio of the 5-SSA to the yttrium is greater than 2.5:1, a yttrium load rate of the CMS can be maintained at 98% or higher, and a preferred molar ratio is greater than or equal to 2.5:1.

(3) Influence of Different pH Values

Figure 3:
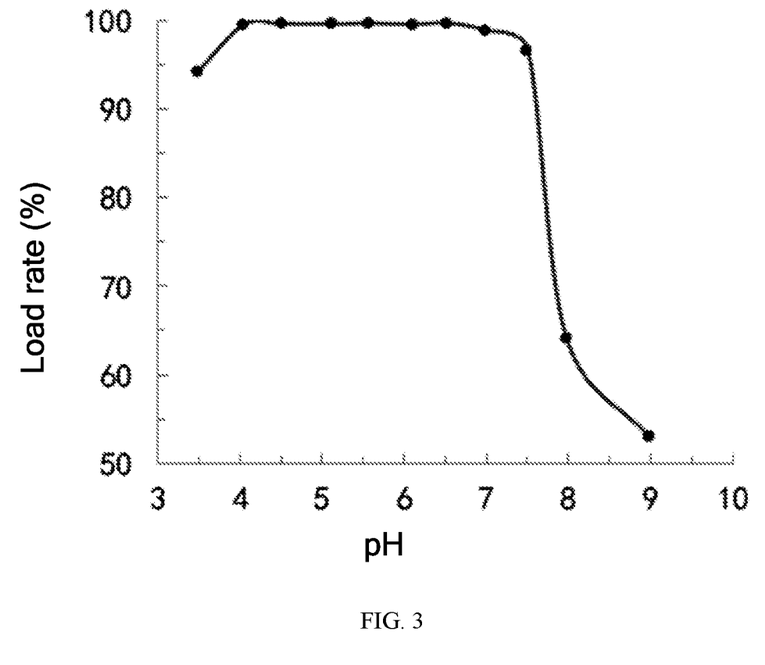
FIG. 3 shows the change of a yttrium load rate in CMS with a pH value of a complexing solution in Example 11 of the present disclosure.

In this example, yttrium-loaded CMSs prepared at the following pH values were tested: 3.5, 4.0, 4.5, 5.0, 5.5, 6.0, 6.5, 7.0, 7.5, 8.0, and 9.0, and test results are shown in FIG. 3.

It can be seen from FIG. 3 that, when the pH value is 4.0 to 7.0, a yttrium load rate of the CMS can be maintained at 98% or higher, and thus the preferred pH value is 4.0 to 7.0.

(4) Influence of Different Temperatures

Figure 4:
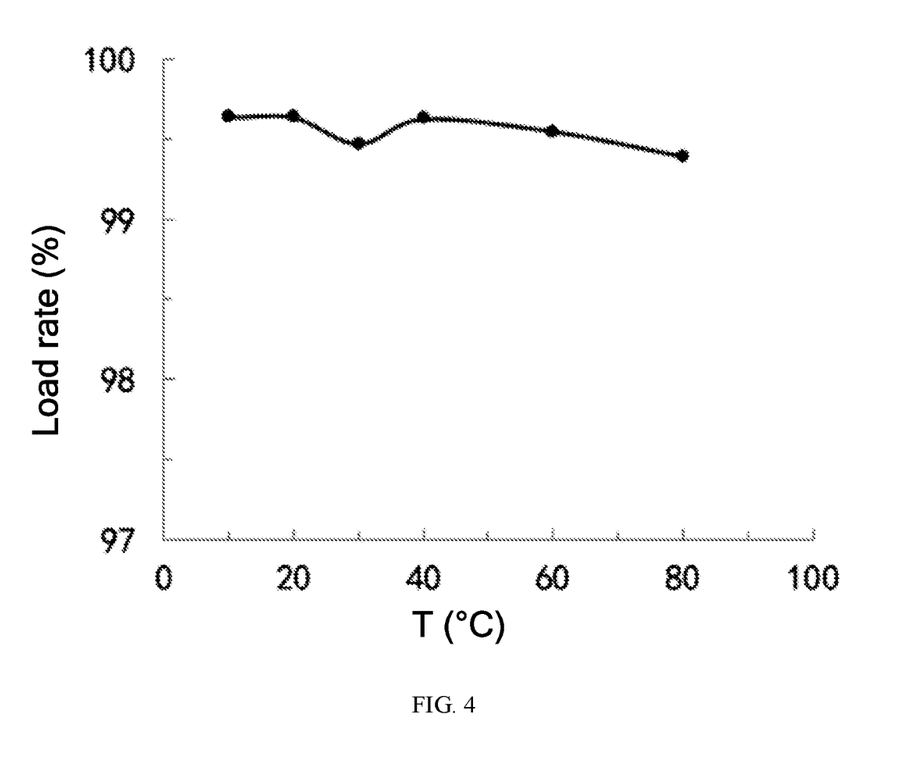
FIG. 4 shows the change of a yttrium load rate in CMS with an adsorption temperature (T) in Example 11 of the present disclosure.

In this example, yttrium-loaded CMSs prepared at the following temperatures for the reaction system aqueous solution were tested: 10° C., 20° C., 30° C., 40° C., 60° C., and 80° C., and test results are shown in FIG. 4.

It can be seen from FIG. 4 that the temperature has a small influence on the adsorption of the CMS to yttrium, and efficient loading can be achieved within the temperature range in the examples of the present disclosure.

(5) Influence of Different Adsorption Times

Figure 5:
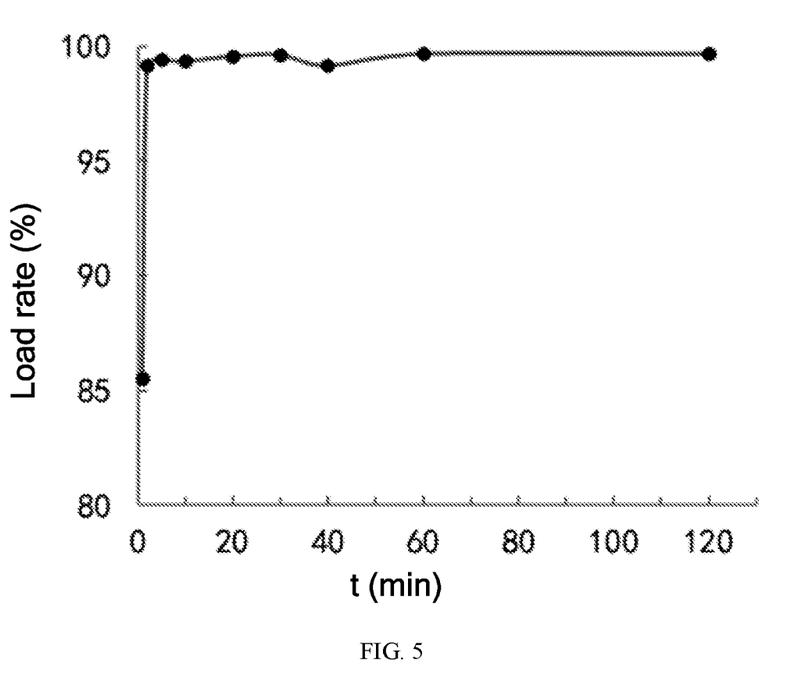
FIG. 5 shows the change of a yttrium load rate in CMS with an adsorption time (t) in Example 11 of the present disclosure.

In this example, yttrium-loaded CMSs prepared through the following adsorption times were tested: 1 min, 2 min, 5 min, 10 min, 20 min, 30 min, 40 min, 60 min, and 120 min, and test results are shown in FIG. 5.

It can be seen from FIG. 5 that the adsorption of the CMS to the yttrium is a fast kinetic process, and when the adsorption time is greater than or equal to 2 min, the load rate is greater than 99%.

(6) Influence of Different Added Yttrium Amounts

Figure 6:
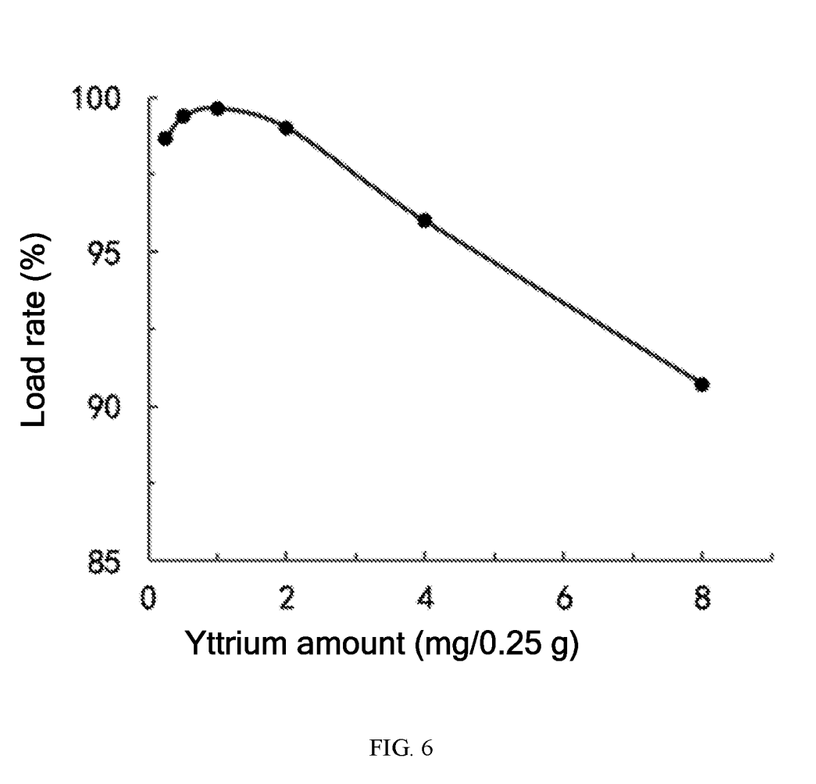
FIG. 6 shows the change of a yttrium load rate in CMS with an added yttrium amount in Example 11 of the present disclosure.

In this example, yttrium-loaded CMSs prepared at the following added yttrium amounts were tested: 0.2, 0.5, 1, 2, 4, and 8 mg/0.25 g, and test results are shown in FIG. 6.

It can be seen from FIG. 6 that the added yttrium amount has an influence on the adsorption rate to some extent. When the added yttrium amount increases to 32 mg/g, the yttrium load rate of the CMS is 90.7%, indicating that a saturated yttrium load per gram of the CMS can be greater than 32 mg.

It should be noted that adsorption behaviors of the CMS to other rare earth elements are very similar to the adsorption behavior of the CMS to yttrium without a significant difference. Detailed data of research on the influencing factors will not be provided in the subsequent examples.

Example 12

Preparation of a Medical Yttrium-90-Loaded CMS

A yttrium-90 ion, a small organic molecule, and water were mixed to allow a reaction to obtain a complex as follows: 1 mL of a 1.0 g/L yttrium trichloride aqueous solution was added to a reaction flask. A radioactive yttrium-90 solution with an activity of 2 Ci was added. Then a specified volume of a 1.0 g/L 5-SSA solution was added, such that the molar amount of the 5-SSA was 5 times a molar amount of the yttrium, and water was added to 50 mL. The pH value of the resulting solution was adjusted to 4.5, water with a pH value of 4.5 was added to 100 mL, and the resulting solution was thoroughly shaken to obtain the complex for later use.

A CMS was allowed to adsorb the complex as follows: 1.0 g of the CMS with a particle size of 20 μm to 60 μm was weighed and added to the above complex solution, and the resulting mixture was stirred for 20 min to complete the adsorption.

The CMS adsorbing the complex was subjected to a first treatment as follows: The supernatant was taken and tested for yttrium-90 radioactivity, and an adsorption rate for the radionuclide was calculated to be 99.2%. 150 mL of a 0.1 mol/L sodium phosphate solution was added to the solution of the CMS adsorbing the complex, and the resulting mixture was stirred for 5 min.

Cleaning and dispensing the yttrium-90-loaded CMS: The yttrium-90-loaded CMS product was washed twice with water for injection (WFI), and the resulting mixture was subjected to solid-liquid separation (SLS) to obtain a yttrium-90-loaded CMS solid. 10 mL of WFI was added to the solid to obtain a suspension, which was equally dispensed into 10 bottles with 1 mL in each bottle. Each bottle had a radioactivity of about 195 mCi and included about 100 mg of the yttrium-90-loaded CMS; the suspension was sterilized at 121° C. for 15 min to obtain a yttrium-90-loaded CMS product for injection.

A dissolution rate of the yttrium-90 nuclide in the yttrium-90-loaded CMS was detected as follows: About 20 mg of the above yttrium-90-loaded CMS was added to a hydrothermal reactor, 20 mL of WFI or a 0.9% sodium chloride solution was added, and the hydrothermal reactor was sealed and placed in a constant-temperature oven with heating and incubation procedures set and run. The resulting system was cooled to room temperature and centrifuged, and a specified volume of the resulting supernatant was taken and tested for activity, and a dissolution rate was calculated. The product was incubated at each temperature of 40° C. (1.0 MPa), 80° C. (1.0 MPa), 100° C. (1.0 MPa), 120° C. (2.0 MPa), 140° C. (3.6 MPa), 160° C. (6.1 MPa), and 180° C. (10.0 MPa) for 2 h, and then a release rate of the yttrium-90 nuclide was tested. Test results are shown in Table 1 below.

Table 1 Yttrium-90 dissolution rates of the yttrium-90-loaded CMS in aqueous solutions at different temperatures and pressures

| No. | Experimental conditions (temperature; pressure; time) | Yttrium-90 dissolution rate (0.9% sodium chloride solution) | Yttrium-90 dissolution rate (WFI) |
| --- | --- | --- | --- |
| 1 | 40° C.; 1.0 Mpa; 2 h | 0.0732% | 0.0094% |
| 2 | 80° C.; 1.0 Mpa; 2 h | 0.0718% | 0.0334% |
| 3 | 100° C.; 1.0 Mpa; 2 h | 0.0429% | 0.0383% |
| 4 | 120° C.; 2.0 Mpa; 2 h | 0.0216% | 0.0323% |
| 5 | 140° C.; 3.6 Mpa; 2 h | 0.0782% | 0.0158% |
| 6 | 160° C.; 6.1 Mpa; 2 h | 0.0656% | 0.0718% |
| 7 | 180° C.; 10.0 Mpa; 2 h | 0.0753% | 0.0824% |

The results in Table 1 show that dissolution rates of the yttrium-90 nuclide of the yttrium-90-loaded CMS product in the WFI and 0.9% sodium chloride solution at 40° C. to 180° C. (pressure: 1.0 MPa to 10.0 MPa) are each lower than 0.1%.

Example 13

Preparation of a Yttrium-90-Loaded CMS

Yttrium-90, a small organic molecule, and water were mixed to allow a reaction to obtain a complex as follows: 1 mL of a 1.0 g/L yttrium trichloride aqueous solution was added to a reaction flask, radioactive yttrium-90 solution with an activity of 10 mCi was added, then a specified volume of a 1.0 g/L 5-NSA solution was added such that a molar amount of the 5-NSA was 6 times a molar amount of the yttrium, and water was added to 50 mL. The pH value of the resulting solution was adjusted to 5.5, water with a pH value of 5.5 was added to 100 mL, and the resulting solution was thoroughly shaken to obtain the complex for later use.

A CMS was allowed to adsorb the complex as follows: 1.0 g of the CMS with a particle size of 20 μm to 60 μm was weighed and added to the above complex solution, and the resulting mixture was stirred for 20 min to complete the adsorption.

The CMS adsorbing the complex was subjected to a first treatment as follows: The supernatant was taken and tested for yttrium-90 radioactivity. The adsorption rate for the radionuclide was calculated to be 98.1%. 150 mL of a 0.1 mol/L sodium phosphate solution was added to the solution of the CMS adsorbing the complex, and the resulting mixture was stirred for 5 min.

Cleaning, sterilizing, and dispensing of the yttrium-90-loaded CMS: The yttrium-90-loaded CMS product was washed twice with WFI. The resulting mixture was subjected to SLS to obtain a yttrium-90-loaded CMS solid, and 10 mL of WFI was added to the solid to obtain a suspension, which was equally dispensed into 10 bottles with 1 mL in each bottle. Each bottle had a radioactivity of about 0.96 mCi and included about 100 mg of the yttrium-90-loaded CMS, and the suspension was sterilized at 121° C. for 15 min.

A yttrium-90 dissolution rate of the yttrium-90-loaded CMS was detected as follows: A bottle of the above product was taken and centrifuged, the resulting supernatant was collected and tested for activity, and a yttrium-90 dissolution rate was calculated to be 0.0435%.

Example 14

Preparation of a Medical Lutetium-177-Loaded CMS

Lutetium-177, a small organic molecule, and water were mixed to allow a reaction to obtain a complex as follows: 0.2 mL of a 1.0 g/L lutetium trichloride aqueous solution was added to a reaction flask, a radioactive lutetium-177 solution with an activity of 0.8 Ci was added, then a specified volume of a 1.0 g/L 5-SSA solution was added such that a molar amount of the 5-SSA was 4 times a molar amount of the lutetium, and water was added to 20 mL. The pH value of the resulting solution was adjusted to 5.0, water with a pH value of 5.0 was added to 30 mL, and the resulting solution was thoroughly shaken to obtain the complex for later use.

A CMS was allowed to adsorb the complex as follows: 0.3 g of the CMS with a particle size of 20 μm to 60 μm was weighed and added to the above complex solution, and the resulting mixture was stirred for 20 min to complete the adsorption.

The CMS adsorbing the complex was subjected to a first treatment as follows: The supernatant was taken and tested for lutetium-177 radioactivity, and the adsorption rate for the radionuclide was calculated to be 99.3%; 150 mL of a 0.1 mol/L sodium phosphate solution was added to the solution of the CMS adsorbing the complex, and the resulting mixture was stirred for 5 min.

Cleaning and dispensing of the lutetium-177-loaded CMS: The lutetium-177-loaded CMS product was washed twice with WFI, the resulting mixture was subjected to SLS to obtain a lutetium-177-loaded CMS solid, and 6 mL of WFI was added to the solid to obtain a suspension, which was equally dispensed into 3 bottles with 2 mL in each bottle. Each bottle had a radioactivity of about 250 mCi and included about 100 mg of the lutetium-177-loaded CMS. The suspension was sterilized at 121° C. for 15 min to obtain a lutetium-177-loaded CMS product for injection.

A dissolution rate of the lutetium-177 nuclide in the lutetium-177-loaded CMS was detected as follows: 20 mg of the above lutetium-177-loaded CMS was added to a hydrothermal reactor, 20 mL of WFI or a 0.9% sodium chloride solution was added, and the hydrothermal reactor was sealed and incubated at 120° C. for 2 h in a constant-temperature oven. The resulting system was cooled to room temperature and centrifuged, a specified volume of the resulting supernatant was tested for activity, and the dissolution rate was calculated. The results show that the lutetium-177-loaded CMS has a dissolution rate of 0.0788% in the 0.9% sodium chloride solution and a dissolution rate of 0.0548% in the WFI.

Example 15

Preparation of a Medical Holmium-166/Holmium-165-Loaded CMS

Holmium-166/holmium-165, a small organic molecule, and water were mixed to allow a reaction to obtain a complex as follows: 0.5 mL of a 0.5 g/L holmium chloride (holmium-165) aqueous solution was added to a reaction flask, a radioactive holmium-166 solution with an activity of 0.5 Ci was added, then a specified volume of a 1.0 g/L 5-SSA solution was added such that a molar amount of the 5-SSA was 4.5 times a molar amount of the holmium, and water was added to 30 mL. The pH value of the resulting solution was adjusted to 4.2, and the resulting solution was thoroughly shaken to obtain the complex for later use.

A CMS was allowed to adsorb the complex as follows: 0.3 g of the CMS with a particle size of 20 μm to 60 μm was weighed and added to the above complex solution, and the resulting mixture was stirred for 10 min to complete the adsorption.

The CMS adsorbing the complex was subjected to a first treatment as follows: The supernatant was tested for holmium-166 radioactivity, and the adsorption rate for the radionuclide was calculated to be 98.6%. 150 mL of a 0.1 mol/L sodium phosphate solution was added to the solution of the CMS adsorbing the complex, and the resulting mixture was stirred for 5 min.

Cleaning and dispensing of the holmium-loaded CMS: The holmium-loaded CMS product was washed twice with 30 mL of WFI, the resulting mixture was subjected to SLS to obtain a holmium-loaded CMS solid, and 6 mL of WFI was added to the solid to obtain a suspension, which was equally dispensed into 3 bottles with 2 mL in each bottle. Each bottle had a radioactivity of about 120 mCi and included about 100 mg of the holmium-loaded CMS. The suspension was sterilized at 121° C. for 15 min to obtain a holmium-166/holmium-165-loaded CMS product for injection.

The dissolution rate of the holmium-166 nuclide in the holmium-166/holmium-165-loaded CMS was detected as follows: 10 mg of the above holmium-166/holmium-165-loaded CMS was added to a hydrothermal reactor, 10 mL of WFI or a 0.9% sodium chloride solution was added, and the hydrothermal reactor was sealed and incubated at 120° C. for 2 h in a constant-temperature oven. The resulting system was cooled to room temperature and centrifuged, a specified volume of a resulting supernatant was tested for activity, and the dissolution rate was calculated. The results show that the holmium-166-loaded CMS has a dissolution rate of 0.0188% in the 0.9% sodium chloride solution and a dissolution rate of 0.0245% in the WFI.

Example 16

Preparation of a Medical Samarium-153-Loaded CMS

Samarium-153, a small organic molecule, and water were mixed to allow a reaction to obtain a complex as follows: 1 mL of a 0.5 g/L samarium chloride aqueous solution was added to a reaction flask, a radioactive samarium-153 solution with an activity of 0.82 Ci was added, then a specified volume of a 1.0 g/L 5-SSA solution was added such that a molar amount of the 5-SSA was 4 times a molar amount of the samarium, and water was added to 30 mL. The pH value of the resulting solution was adjusted to 5.6, water with a pH value of 5.6 was added to 50 mL, and the resulting solution was thoroughly shaken to obtain the complex for later use.

A CMS was allowed to adsorb the complex as follows: 0.5 g of the CMS with a particle size of 20 μm to 60 μm was weighed and added to the above complex solution, and the resulting mixture was stirred for 10 min to complete the adsorption.

The CMS adsorbing the complex was subjected to a first treatment as follows: The supernatant was taken and tested for samarium-153 radioactivity, and the adsorption rate for the radionuclide was calculated to be 99.3%. 50 mL of a 0.1 mol/L sodium phosphate solution was added to the solution of the CMS adsorbing the complex, and the resulting mixture was stirred for 5 min.

Cleaning and dispensing of the samarium-153-loaded CMS: The samarium-153-loaded CMS product was washed twice with 50 mL of WFI, the resulting mixture was subjected to SLS to obtain a samarium-153-loaded CMS solid, and 10 mL of WFI was added to the solid to obtain a suspension, which was equally dispensed into 5 bottles with 1 mL in each bottle. Each bottle had a radioactivity of about 150 mCi and included about 100 mg of the samarium-153-loaded CMS; the suspension was sterilized at 121° C. for 15 min to obtain a samarium-153-loaded CMS product for injection.

A dissolution rate of the samarium-153 nuclide in the samarium-153-loaded CMS was detected as follows: 10 mg of the above samarium-153-loaded CMS was added to a hydrothermal reactor, 10 mL of WFI or a 0.9% sodium chloride solution was added, and the hydrothermal reactor was sealed and incubated at 120° C. for 2 h in a constant-temperature oven. The resulting system was cooled to room temperature and centrifuged. A specified volume of the resulting supernatant was tested for activity, and the dissolution rate was calculated. The results show that the samarium-153-loaded CMS has a dissolution rate of 0.0326% in the 0.9% sodium chloride solution and a dissolution rate of 0.0137% in the WFI.

Example 17

Preparation of a CMS Loaded with Light Rare Earth Metals (Lanthanum, Cerium, Praseodymium, Neodymium, Promethium, Samarium, and Europium)

Light rare earth ions, a small organic molecule, and water were mixed to allow a reaction to obtain a complex as follows: 3 mL of a 0.5 g/L aqueous solution of lanthanum chloride, cerium chloride, praseodymium chloride, neodymium chloride, promethium chloride, samarium chloride, and europium chloride was taken and added to a reaction flask, which was thoroughly shaken. Then a specified volume of a 1.0 g/L 5-SSA solution was added such that a molar amount of the 5-SSA was 8 times a molar amount of the rare earth ions. The pH value of the resulting solution was adjusted to 4.8, and the solution was thoroughly shaken to obtain the complex for later use.

A CMS was allowed to adsorb the complex as follows: 3.0 g of the CMS was weighed and added to the above complex solution, and the resulting mixture was stirred for 10 min to complete the adsorption.

The CMS adsorbing the complex was subjected to a first treatment as follows: The supernatant was tested through inductively coupled plasma atomic emission spectroscopy (ICP-AES) to determine the content of the supernatant (lanthanum, cerium, praseodymium, neodymium, promethium, samarium, and europium). An average load rate of the lanthanum, cerium, praseodymium, neodymium, promethium, samarium, and europium was calculated to be 98.3%, and then the first treatment was conducted according to one of the following methods:

Method 1: 200 mg of the above CMS loaded with the light rare earth nuclides was added to 50 mL of a 0.1 mol/L sodium carbonate aqueous solution. The resulting mixture was thoroughly shaken, subjected to a reaction for 10 min, and subjected to SLS, and the resulting solid was dried. The rare earth nuclides in the rare earth-doped CMS obtained by this method mainly existed in the form of a carbonate.

Method 2: 200 mg of the above CMS loaded with the light rare earth nuclides was added to 50 mL of a 0.1 mol/L sodium phosphate solution, and the resulting mixture was stirred for 5 min. The rare earth nuclides in the rare earth-doped CMS obtained by this method mainly existed in the form of a phosphate.

Method 3: 200 mg of the above CMS loaded with the light rare earth nuclides was added to 50 mL of a 0.1 mol/L tannic acid solution, and the resulting mixture was stirred for 5 min.

Method 4: 200 mg of the above CMS loaded with the light rare earth nuclides was treated at 800° C. for 2 h in a high-temperature furnace, cooled, and washed with water until neutral. In the product obtained by this method, the rare earth nuclides were mainly loaded on the CMS in the form of a rare earth oxide (REO).

Method 5: 200 mg of the above CMS loaded with the light rare earth nuclides was treated at 800° C. for 2 h in a high-temperature furnace under a hydrogen atmosphere, cooled, and washed with water until neutral. In the product obtained by this method, the rare earth nuclides were mainly loaded on the CMS in the form of a rare earth metal.

Method 6: 200 mg of the above CMS loaded with the light rare earth nuclides was treated at 900° C. for 3 h in a high-temperature furnace under a hydrogen sulfide and carbon disulfide atmosphere, cooled, and washed with water until neutral. In the product obtained by this method, the rare earth nuclides were mainly loaded on the CMS in the form of a rare earth sulfide.

Since many, if not all, rare earth nuclide ions (whether light rare earth or heavy rare earth) have similar chemical behaviors, the above 6 curing methods are also suitable for the curing of other rare earth nuclides on the CMS.

The dissolution rate of the light rare earth nuclides in the light rare earth-loaded CMS was detected as follows: About 50 mg of each of the CMS products obtained by the methods 1 to 6 was added to a hydrothermal reactor, 10 mL of purified water was added, and the hydrothermal reactor was sealed and incubated at 120° C. for 2 h in a constant-temperature oven. The resulting system was cooled to room temperature and centrifuged, and a specified volume of a resulting supernatant was tested to determine the content of the light rare earth nuclide ions. The results show that the total dissolution rates of the light rare earth nuclides of the products obtained by methods 1 to 6 in water are 0.065%, 0.096%, 0.071%, 0.068%, 0.091%, and 0.077%, respectively.

Example 18

Preparation of a CMS Loaded with Heavy Rare Earths (Gadolinium, Terbium, Dysprosium, Holmium, Erbium, Thulium, Ytterbium, Lutetium, and Yttrium)

Heavy rare earth ions, a small organic molecule, and water were mixed to allow a reaction to obtain a complex as follows: 2 mL of a 0.5 g/L aqueous solution of gadolinium chloride, terbium chloride, dysprosium chloride, holmium chloride, erbium chloride, thulium chloride, ytterbium chloride, lutetium chloride, and yttrium chloride was added to a reaction flask, which was thoroughly shaken. Then a specified volume of a 1.0 g/L 5-SSA solution was added such that a molar amount of the 5-SSA was 10 times a molar amount of the rare earth ions. The pH value of the resulting solution was adjusted to 4.9, water with a pH value of 4.9 was added to 200 mL, and the resulting solution was thoroughly shaken to obtain the complex for later use.

A CMS was allowed to adsorb the complex as follows: 5.0 g of the CMS was weighed and added to the above solution, and the resulting mixture was stirred for 10 min to complete the adsorption.

The CMS adsorbing the complex was subjected to a first treatment as follows: The supernatant was tested through ICP-AES to determine the content of the CMS (gadolinium, terbium, dysprosium, holmium, erbium, thulium, ytterbium, lutetium, and yttrium). The average load rate was calculated to be 98.8%. 150 mL of a 0.1 mol/L sodium phosphate solution was added to the CMS loaded with heavy rare earth nuclides. The resulting mixture was shaken for 5 min, and the CMS was washed twice with purified water and then separated out through SLS.

The dissolution rate of the heavy rare earth nuclides in the heavy rare earth-loaded CMS was detected as follows: About 50 mg of the CMS product was added to a hydrothermal reactor, 10 mL of purified water was added, and the hydrothermal reactor was sealed and incubated at 120° C. for 2 h in a constant-temperature oven. The resulting system was cooled to room temperature and centrifuged, and a specified volume of a resulting supernatant was tested to determine the content of the heavy rare earth nuclide ions. The results show that the total dissolution rate of the heavy rare earth nuclides in water is 0.087%.

Example 19

Preparation of an Iron-Loaded CMS

An iron ion, a small organic molecule, and water were mixed to allow a reaction to obtain a complex as follows: 10 mL of a 0.5 g/L iron chloride aqueous solution was added to a reaction flask, and a specified volume of a 0.5 g/L sodium catechol-3,5-disulfonate solution was added such that a molar amount of the sodium catechol-3,5-disulfonate was 2 times a molar amount of the iron ion. The pH value of the resulting solution was adjusted to 3.5, and the solution was thoroughly shaken to obtain the complex for later use.

A CMS was allowed to adsorb the complex as follows: 1.0 g of the CMS was weighed and added to the above solution, and the resulting mixture was stirred for 10 min to complete the adsorption.

The CMS adsorbing the complex was subjected to a first treatment as follows: The supernatant was tested through spectrophotometry to determine an iron content, and the load rate was calculated to be 99.3%. The above iron-loaded CMS was taken, dried, treated at 600° C. for 2 h in a high-temperature furnace, cooled, and washed with purified water until neutral to obtain an iron oxide-loaded CMS.

Cobalt and nickel have similar chemical properties to iron; thus, the above method can be used to prepare a nickel-loaded CMS and a cobalt-loaded CMS.

The dissolution rate of the iron ion in the iron-loaded CMS was detected as follows: About 100 mg of the above CMS product was added to a hydrothermal reactor, 10 mL of purified water was added, and the hydrothermal reactor was sealed and incubated at 120° C. for 2 h in a constant-temperature oven. The resulting system was cooled to room temperature and centrifuged. A specified volume of the resulting supernatant was tested to determine the content of the iron ion. The results show that the dissolution rate of the iron in water is 0.098%.

Example 20

Preparation of a Copper-Loaded CMS

A copper ion, a small organic molecule, and water were mixed to allow a reaction to obtain a complex as follows: 10 mL of a 0.1 g/L copper chloride aqueous solution was added to a reaction flask, and a specified volume of a 1.0 g/L 2,6-pyridinedicarboxylic acid solution was added such that a molar amount of the 2,6-pyridinedicarboxylic acid was 2.5 times a molar amount of the copper ion. The pH value of the resulting solution was adjusted to 5.5, and the solution was thoroughly shaken to obtain the complex for later use.

A CMS was allowed to adsorb the complex as follows: 1.0 g of the CMS was weighed and added to the above solution, and the resulting mixture was stirred for 10 min to complete the adsorption.

The CMS adsorbing the complex was subjected to a first treatment as follows: The supernatant was tested through spectrophotometry to determine the copper content, and the load rate was calculated to be 98.4%. Then the first treatment was conducted according to one of the following methods:

Method 1: 200 mg of the above copper-loaded CMS was added to a 0.1 mol/L sodium sulfide solution. The resulting mixture was thoroughly shaken for 2 min and subjected to SLS, and the resulting solid was dried to obtain a copper sulfide-loaded CMS.

Method 2: 200 mg of the above copper-loaded CMS was taken and subjected to SLS, and the resulting solid was dried and treated at 600° C. for 2 h in a high-temperature furnace to obtain a copper oxide-loaded CMS.

A dissolution rate of the copper ion in the copper-loaded CMS was detected as follows: About 100 mg of each of the CMS products prepared by methods 1 and 2 was added to a hydrothermal reactor, 10 mL of purified water was added, and the hydrothermal reactor was sealed and incubated at 120° C. for 2 h in a constant-temperature oven. The resulting system was cooled to room temperature and centrifuged, and a specified volume of the resulting supernatant was tested to determine the content of the copper ion. The results show that copper dissolution rates of the products in water are 0.061% and 0.054%, respectively.

Example 21

Preparation of a Zinc-Loaded CMS

A zinc ion, a small organic molecule, and water were mixed to allow a reaction to obtain a complex as follows:

2 mL of a 1.0 g/L zinc nitrate aqueous solution was added to a reaction flask, and then a specified volume of a 1.0 g/L 8-hydroxyquinoline-5-sulfonic acid solution was added such that a molar amount of the 8-hydroxyquinoline-5-sulfonic acid was 6 times a molar amount of the zinc ion. The pH value of the resulting solution was adjusted to 6.5, and the solution was thoroughly shaken to obtain the complex for later use.

A CMS was allowed to adsorb the complex as follows:

1.0 g of the CMS was weighed and added to the above solution, and the resulting mixture was stirred for 10 min to complete the adsorption.

The CMS adsorbing the complex was subjected to a first treatment as follows:

The supernatant was tested using spectrophotometry to determine the zinc content, and a load rate was calculated to be 97.3%. 200 mg of the above zinc-loaded CMS was subjected to SLS, and the resulting solid was dried and treated at 800° C. for 2 h in a high-temperature furnace to obtain a zinc oxide-loaded CMS.

The dissolution rate of the zinc ion in the zinc-loaded CMS was detected as follows: About 100 mg of the above CMS product was added to a hydrothermal reactor, 10 mL of purified water was added, and the hydrothermal reactor was sealed and incubated at 120° C. for 2 h in a constant-temperature oven. The resulting system was cooled to room temperature and centrifuged, and a specified volume of a resulting supernatant was tested to determine the content of the zinc ion. The results show that the dissolution rate of the zinc in water is 0.021%.

Example 22

Preparation of a Titanium-Loaded CMS

A titanium ion, a small organic molecule, and water were mixed to allow a reaction to obtain a complex as follows:

20 mL of a 0.1 g/L titanium tetrachloride aqueous solution was added to a reaction flask, and then a specified volume of a 1.0 g/L 5-SSA solution was added such that a molar amount of the 5-SSA was 3 times a molar amount of the titanium ion. The pH value of the resulting solution was adjusted to 5.0, and the solution was thoroughly shaken to obtain the complex for later use.

A CMS was allowed to adsorb the complex as follows:

1.0 g of the CMS was weighed and added to the above solution, and the resulting mixture was stirred for 10 min to complete the adsorption.

The CMS adsorbing the complex was subjected to a first treatment as follows:

The supernatant was tested using spectrophotometry to determine titanium content, and a load rate was calculated to be 98.9%. 200 mg of the above titanium-loaded CMS was subjected to SLS, and the resulting solid was dried and treated at 800° C. for 2 h in a high-temperature furnace to obtain a titanium oxide-loaded CMS.

The dissolution rate of the titanium ion in the titanium-loaded CMS was detected as follows: About 100 mg of the above CMS product was added to a hydrothermal reactor, 10 mL of purified water was added, and the hydrothermal reactor was sealed and incubated at 120° C. for 2 h in a constant-temperature oven. The resulting system was cooled to room temperature and centrifuged, and a specified volume of the resulting supernatant was taken and tested to determine the content of the titanium ion. The results show that the dissolution rate of titanium in water is 0.018%.

Example 23

Preparation of a Gallium-Loaded CMS

A gallium ion, a small organic molecule, and water were mixed to allow a reaction to obtain a complex as follows:

2 mL of a 0.1 g/L gallium nitrate aqueous solution was added to a reaction flask, and then a specified volume of a 1.0 g/L 2,6-pyridinedicarboxylic acid solution was added such that a molar amount of the 2,6-pyridinedicarboxylic acid was 4 times a molar amount of the gallium ion. The pH of the resulting solution was adjusted to 6.0, and the solution was thoroughly shaken to obtain the complex for later use.

A CMS was allowed to adsorb the complex as follows:

1.0 g of the CMS was weighed and added to the above solution, and the resulting mixture was stirred for 10 min to complete the adsorption.

The CMS adsorbing the complex was subjected to a first treatment as follows:

The supernatant was tested through spectrophotometry to determine a gallium content, and a load rate was calculated to be 97.9%, and 200 mg of the above gallium-loaded CMS was subjected to SLS. The resulting solid was dried and treated at 800° C. for 2 h in a high-temperature furnace to obtain a gallium oxide-loaded CMS.

A dissolution rate of the gallium ion in the gallium-loaded CMS was detected as follows: About 100 mg of the above CMS product was added to a hydrothermal reactor, 10 mL of purified water was added, and the hydrothermal reactor was sealed and incubated at 120° C. for 2 h in a constant-temperature oven. The resulting system was cooled to room temperature and centrifuged, and a specified volume of the resulting supernatant was tested to determine the content of the gallium ion. The results show that the dissolution rate of the gallium in water is 0.088%.

Finally, it should be noted that the above examples are merely intended to describe the technical solutions of the present disclosure, rather than to limit the present disclosure. Although the present disclosure is described in detail with reference to the above examples, persons of ordinary skill in the art should understand that modifications may be made to the technical solutions described in the above examples or equivalent replacements may be made to some or all technical features thereof, and such modifications or replacements do not depart from the scope of the present disclosure.

What is claimed is:

1. A method for preparing a metal nuclide-loaded carbon microsphere, CMS, comprising the following steps:
   subjecting a metal ion and an organic molecule to a first reaction in an aqueous solution to obtain a complex, wherein the organic molecule is selected from the group consisting of 5-sulfosalicylic acid, 5-nitrosalicylic acid, phthalic acid, isophthalic acid, sodium catechol-3,5-disulfonate, pyrogallol, resorcinol, 8-hydroxyquinoline-5-sulfonic acid, 2,6-pyridinedicarboxylic acid, 2-pyridinecarboxylic acid, and 1,10-phenanthroline;
   allowing a CMS to adsorb the complex, wherein the CMS is a spherical or non-spherical activated carbon product with a plurality of micropores and/or mesopores, and the metal ion is adsorbed in the plurality of micropores and/or mesopores of the CMS adsorbing the complex;

subjecting the CMS adsorbing the complex to a first treatment to obtain a metal nuclide-loaded CMS, wherein the first treatment comprises mixing the CMS adsorbing the complex with an anion solution to allow a second reaction;

subjecting the metal nuclide-loaded CMS to solid-liquid separation to obtain a solid then adding water for injection, and sterilizing at 121° C. for 15 min to obtain a metal nuclide-loaded CMS product for injection;

wherein the metal nuclide-loaded CMS in the metal nuclide-loaded CMS product for injection has a metal nuclide dissolution rate of less than 0.1% in aqueous solution at 180° C. for 2 hours at a pressure of 1-10 MPa.

2. The method according to claim 1, wherein a mixed solution of the metal ion, the organic molecule, and water has a pH value of 3.0 to 7.0; and a molar ratio of the organic molecule to the metal ion is 1-1,000:1.

3. The method according to claim 1, wherein the metal ion comprises:

$Sc^{3+}$, $Y^{3+}$, $La^{3+}$, $Ce^{3+}$, $Pr^{3+}$, $Nd^{3+}$, $Pm^{3+}$, $Sm^{3+}$, $Eu^{3+}$, $Gd^{3+}$, $Tb^{3+}$, $Dy^{3+}$, $Ho^{3+}$, $Er^{3+}$, $Tm^{3+}$, $Yb^{3+}$, $Lu^{3+}$, $Cu^{2+}$, $Zn^{2+}$, $Fe^{3+}$, $Co^{3+}$, $Ni^{3+}$, $Ti^{4+}$, $Ga^{2+}$, an element with a chemical behavior similar to the $Sc^{3+}$, the $Y^{3+}$, the $La^{3+}$, the $Ce^{3+}$, the $Pr^{3+}$, the $Nd^{3+}$, the $Pm^{3+}$, the $Sm^{3+}$, the $Eu^{3+}$, the $Gd^{3+}$, the $Tb^{3+}$, the $Dy^{3+}$, the $Ho^{3+}$, the $Er^{3+}$, the $Tm^{3+}$, the $Yb^{3+}$, the $Lu^{3+}$, the $Cu^{2+}$, the $Zn^{2+}$, the $Fe^{3+}$, the $Co^{3+}$, the $Ni^{3+}$, the $Ti^{4+}$, or the $Ga^{2+}$, and non-radioactive and radioactive isotopes of the $Sc^{3+}$, the $Y^{3+}$, the $La^{3+}$, the $Ce^{3+}$, the $Pr^{3+}$, the $Nd^{3+}$, the $Pm^{3+}$, the $Sm^{3+}$, the $Eu^{3+}$, the $Gd^{3+}$, the $Tb^{3+}$, the $Dy^{3+}$, the $Ho^{3+}$, the $Er^{3+}$, the $Tm^{3+}$, the $Yb^{3+}$, the $Lu^{3+}$, the $Cu^{2+}$, the $Zn^{2+}$, the $Fe^{3+}$, the $Co^{3+}$, the $Ni^{3+}$, the $Ti^{4+}$, or the $Ga^{2+}$.

4. The method according to claim 1, wherein the anion solution comprises one selected from the group consisting of a phosphate solution, a carbonate solution, a tannic acid solution, and a sulfide ion solution.

5. A method for preparing a metal nuclide-loaded carbon microsphere, CMS, comprising the following steps:

subjecting a metal ion and an organic molecule to a first reaction in an aqueous solution to obtain a complex, wherein the organic molecule is selected from the group consisting of 5-sulfosalicylic acid, 5-nitrosalicylic acid, phthalic acid, isophthalic acid, sodium catechol-3,5-disulfonate, pyrogallol, resorcinol, 8-hydroxyquinoline-5-sulfonic acid, 2,6-pyridinedicarboxylic acid, 2-pyridinecarboxylic acid, and 1,10-phenanthroline;

allowing a CMS to adsorb the complex, wherein the CMS is a spherical or non-spherical activated carbon product with a plurality of micropores and/or mesopores, and the metal ion is adsorbed in the plurality of micropores and/or mesopores of the CMS adsorbing the complex; and subjecting the CMS adsorbing the complex to a first treatment to obtain a metal nuclide-loaded CMS; wherein the first treatment is one selected from the group consisting of:

subjecting the CMS adsorbing the complex to an oxidation treatment; and subjecting the CMS adsorbing the complex to a reduction treatment; and wherein the oxidation treatment is a high-temperature treatment in an inert gas atmosphere or a trace oxygen-containing atmosphere, and the reduction treatment is a treatment with a reducing agent or a high-temperature reducing gas atmosphere.

6. A method of use of the metal nuclide-loaded CMS according to claim 1, wherein the use comprises a use in a medical treatment.

7. The method of use of the metal nuclide-loaded CMS according to claim 6, wherein the CMS has a particle size of 0.1 μm to 1,000 μm; and a particle size of a radioactive CMS product for a radioembolization of a solid liver tumor is 20 μm to 60 μm.

8. The method according to claim 5, wherein the metal ion comprises:

$Sc^{3+}$, $Y^{3+}$, $La^{3+}$, $Ce^{3+}$, $Pr^{3+}$, $Nd^{3+}$, $Pm^{3+}$, $Sm^{3+}$, $Eu^{3+}$, $Gd^{3+}$, $Tb^{3+}$, $Dy^{3+}$, $Ho^{3+}$, $Er^{3+}$, $Tm^{3+}$, $Yb^{3+}$, $Lu^{3+}$, $Cu^{2+}$, $Zn^{2+}$, $Fe^{3+}$, $Co^{3+}$, $Ni^{3+}$, $Ti^{4+}$, $Ga^{2+}$, an element with a chemical behavior similar to the $Sc^{3+}$, the $Y^{3+}$, the $La^{3+}$, the $Ce^{3+}$, the $Pr^{3+}$, the $Nd^{3+}$, the $Pm^{3+}$, the $Sm^{3+}$, the $Eu^{3+}$, the $Gd^{3+}$, the $Tb^{3+}$, the $Dy^{3+}$, the $Ho^{3+}$, the $Er^{3+}$, the $Tm^{3+}$, the $Yb^{3+}$, the $Lu^{3+}$, the $Cu^{2+}$, the $Zn^{2+}$, the $Fe^{3+}$, the $Co^{3+}$, the $Ni^{3+}$, the $Ti^{4+}$, or the $Ga^{2+}$, and non-radioactive and radioactive isotopes of the $Sc^{3+}$, the $Y^{3+}$, the $La^{3+}$, the $Ce^{3+}$, the $Pr^{3+}$, the $Nd^{3+}$, the $Pm^{3+}$, the $Sm^{3+}$, the $Eu^{3+}$, the $Gd^{3+}$, the $Tb^{3+}$, the $Dy^{3+}$, the $Ho^{3+}$, the $Er^{3+}$, the $Tm^{3+}$, the $Yb^{3+}$, the $Lu^{3+}$, the $Cu^{2+}$, the $Zn^{2+}$, the $Fe^{3+}$, the $Co^{3+}$, the $Ni^{3+}$, the $Ti^{4+}$, or the $Ga^{2+}$.

9. The metal nuclide-loaded CMS prepared by the method according to claim 5, wherein the metal nuclide-loaded CMS has a metal nuclide dissolution rate of less than 0.1% in the aqueous solution at 180° C. for 2 hours at a pressure of 1-10 MPa.

10. The method according to claim 5, wherein a mixed solution of the metal ion, the organic molecule, and water has a pH value of 3.0 to 7.0; and a molar ratio of the organic molecule to the metal ion is 1-1,000:1.

* * * * *